(12) United States Patent
Kennish et al.

(10) Patent No.: US 7,791,490 B2
(45) Date of Patent: *Sep. 7, 2010

(54) INTERACTIVE PACKAGING FOR DEVELOPMENT OF PERSONAL HYGIENE HABITS

(75) Inventors: Yolanda Christina Kennish, Frankfurt (DE); Philip Andrew Sawin, Wyoming, OH (US); Alyce Johnson Papa, Wyoming, OH (US); Kilian John O'Neill, Bad Homburg (DE)

(73) Assignee: The Procter & Gamble Company, Cincinnati, OH (US)

( * ) Notice: Subject to any disclaimer, the term of this patent is extended or adjusted under 35 U.S.C. 154(b) by 117 days.

This patent is subject to a terminal disclaimer.

(21) Appl. No.: 12/167,345

(22) Filed: Jul. 3, 2008

(65) Prior Publication Data

US 2008/0266113 A1 Oct. 30, 2008

Related U.S. Application Data

(63) Continuation of application No. 11/349,007, filed on Feb. 7, 2006, now Pat. No. 7,411,511.

(51) Int. Cl.
*G08B 23/00* (2006.01)
*G05B 23/02* (2006.01)
*G07C 3/00* (2006.01)

(52) U.S. Cl. .................. 340/573.1; 340/3.1; 377/15

(58) Field of Classification Search ............. 340/573.1, 340/540, 539.11, 693.9, 692; 434/236, 262; 4/902, 619; 222/321.9; 377/13–16
See application file for complete search history.

(56) References Cited

U.S. PATENT DOCUMENTS 5,202,666 A 4/1993 Knippscheer (Continued)

FOREIGN PATENT DOCUMENTS

EP 0 210 694 A1 2/1987

(Continued)

*Primary Examiner*—Toan N Pham
(74) *Attorney, Agent, or Firm*—Charles R. Matson

(57) ABSTRACT

The disclosure is directed to an interactive packaging system for monitoring the usage of personal hygiene products, personal hygiene product packages, and restroom facilities. The interactive packaging system may include a plurality of usage monitoring devices each configured to detect physical stimulus associated with the usage of the product, package or facility with which the usage monitoring device is associate, and to transmit usage messages containing information relating to the detected physical stimulus. The interactive packaging system may further include a base station configured to receive the usage messages transmitted by the plurality of usage monitoring devices and to generate sensory perceptible outputs corresponding to the information contained in the usage messages. Either the usage monitoring devices or the base station may be configured to determine whether the products, packages or facilities are used appropriately based on the detected physical stimulus.

16 Claims, 4 Drawing Sheets

U.S. PATENT DOCUMENTS

| | | |
|---|---|---|
| 5,610,589 A | 3/1997 | Evans et al. |
| 5,945,910 A | 8/1999 | Gorra |
| 5,952,924 A | 9/1999 | Evans et al. |
| 6,037,871 A | 3/2000 | Babylon |
| 6,236,317 B1 | 5/2001 | Cohen et al. |
| 6,426,701 B1 | 7/2002 | Levy et al. |
| 6,772,454 B1 | 8/2004 | Barry et al. |
| 6,956,498 B1 | 10/2005 | Gauthier et al. |
| 6,975,231 B2 | 12/2005 | Lane et al. |
| 7,015,816 B2 | 3/2006 | Wildman et al. |
| 7,372,367 B2 * | 5/2008 | Lane et al. ............... 340/573.1 |
| 2004/0018474 A1 | 1/2004 | D'Ippolito |
| 2005/0239029 A1 | 10/2005 | Yzermans et al. |
| 2009/0267776 A1 * | 10/2009 | Glenn et al. ............. 340/573.1 |
| 2009/0273477 A1 * | 11/2009 | Barnhill .................... 340/573.1 |

FOREIGN PATENT DOCUMENTS

| | | |
|---|---|---|
| EP | 0 914 793 A1 | 5/1999 |
| WO | WO 02/086842 A1 | 10/2002 |

* cited by examiner

INTERACTIVE PACKAGING FOR DEVELOPMENT OF PERSONAL HYGIENE HABITS

CROSS REFERENCE TO RELATED APPLICATION

This application is a continuation application of U.S. application Ser. No. 11/349,007, filed Feb. 7, 2006 now U.S. Pat. No. 7,411,511, which is hereby incorporated by reference.

FIELD OF THE INVENTION

The present disclosure generally relates to packaging for personal hygiene products, and in particular to interactive packaging for assisting in the development of personal hygiene habits by children and other people having limited mental or physical capabilities, such as mentally disabled and physically handicapped people, which may be adapted to provide a sensory perceptible indication of the appropriateness of the usage of the package and/or the personal hygiene product stored therein.

BACKGROUND OF THE INVENTION

As infants grow into toddlers and slightly older children, they begin to develop the capacity and ability to perform personal hygiene activities on their own. During infancy, the infants are entirely dependent on their parents and other caregivers because they lack the cognitive abilities, physical skills and dexterity required to perform many tasks, including personal hygiene tasks. Eventually, though, the infants/toddlers develop the physical and mental skills necessary to perform these tasks independently.

Initially, the caregivers work with the children to teach and train them on the processes for performing the various personal hygiene activities on their own. During toilet training, for example, a caregiver teaches a child to respond to the sensation of having to use the restroom by using the toilet properly, followed by wiping the genital and/or perianal regions with toilet paper or flushable wipes, and then by cleansing their hands using hand soap, hand wipes and the like. During the training process, the caregiver assists the child in correctly performing the steps of the tasks, thereby re-enforcing the manner in which to correctly perform the steps, and to offer encouragement, further instruction, reassurance that the child is properly performing the tasks, and motivation for the child to develop independence in performing the tasks. Similar interaction applies to all manner of personal hygiene tasks, including dental hygiene, bathing and the like.

Numerous products exist to assist the caregivers and the children in the development of the children's personal hygiene habits. Such products fall into several different categories. For example, training guides and other instruction-oriented materials have been developed. These products include both guides for the caregiver in assisting children in the development of personal hygiene skills, and instructional guides for teaching children when and how to perform the various personal hygiene tasks. For example, U.S. Patent Publication No. 2004/0018474 to D'Ippolito discloses an introductory adult set of instructions providing background information and directions for an adult to apply a step-by-step life experiences and good habits and activities and knowledge learning program for a child. Exercises and activities are performed by the child as instructed by the adult. Each exercise and activity includes an adult guide for when, how, and why to apply them. A book, workbook, e-book, video, sound recording, computer program or any other desired media can be used to assist the parent in training and motivating the child. According to D'Ippolito, steps in the life experiences and good habits and activities and knowledge learning program include discovery, interest, attitude, motivation, vicarious experience, experimentation, practice, and learning and mastery of the life experiences and good habits and activities and knowledge.

Another class of personal hygiene training products includes products providing instruction and re-enforcement to the children at the time they are attempting to perform the personal hygiene tasks. For example, U.S. Pat. No. 6,037,871 to Babylon discloses a bathroom hygiene training system for teaching proper bathroom hygiene to a child. The bathroom hygiene training system includes a toilet sensing housing including toilet handle and seat sensors, and a toilet sound playback assembly. The bathroom hygiene training system further includes a step stool having a stepstool sound playback assembly and a sensor pad coupled to the platform of the stepstool, and a soap dish sensing housing resting upon the countertop of a sink proximate a washbasin, and including a soap dish sound playback assembly and a soap dish sensor coupled to the soap dish sensing housing. When the sensors of the system are actuated by movement or use of the corresponding portion of the toilet, step stool or soap dish housing, the corresponding playback assembly outputs praise for the task performed and a reminder to perform the next step in the process. For example, upon activation of the handle sensor, the toilet sound playback assembly produces an audible praise for flushing message and a reminder to wash message.

A further class of products includes products providing feedback or additional instruction after a child has performed a personal hygiene task. This category may include products providing varying feedback or messages as a child progresses through various stages of the personal hygiene training process. For example, U.S. Patent Publication No. 2005/0239029 A1, to Yzermans et al. discloses a method of enunciating a prerecorded message related to toilet training in response to a contact by a consumer via, for example, a telephone call or the Internet. In particular embodiments, the method can include providing at least a first prerecorded message related to toilet training; receiving a contact from a consumer; and enunciating the prerecorded message to the consumer. The prerecorded messages can include messages directed to the caregiver, the child, or both. The method can further include providing a toilet training garment that includes a character graphic; and providing at least a first prerecorded message related to toilet training, the prerecorded message enunciated by a voice or image associated with the character graphic. Additionally, the method can include providing a package containing a plurality of toilet training garments, wherein access information is included on the package, within the package, or on each toilet training garment.

As the children develop confidence in their ability to perform their personal hygiene tasks, the children begin to desire autonomy in the performance of the tasks, and the caregivers strive for the children to develop the skills for performing the tasks independently without the necessity of oversight by the caregivers. However, at the point when the children desire autonomy, the performance of the personal hygiene task may not yet be ingrained to the point where the personal hygiene task is performed habitually and correctly each time by the children. Additionally, certain tasks require the use of multiple personal hygiene products and/or facilities, such as toilets, sinks and bathtubs/showers, in the appropriate manner and in the appropriate sequence in order for the task to be performed correctly. In previously known products, while the usage of an individual product may be detected and feedback may be provided based on the detection of that usage, the appropriateness of the detected use of the personal hygiene products and facilities by the child is not evaluated, and the child and the caregiver are not provided with corresponding feedback of the appropriateness of the use by the child. Therefore, a need exists for products and/or product packaging that can determine the appropriateness of the use of personal hygiene products and related facilities, including the sequence of usage of such products and facilities, and for providing appropriate feedback to the children and to the caregivers to monitor and ensure the proper development of the necessary personal hygiene habits by the children as they develop. Such products and/or packaging would enable a child to recognize success in using the personal hygiene products appropriately and in performing personal hygiene tasks correctly based on the feedback received by the child. Moreover, feedback from such products and/or packaging would allow the child to demonstrate to the parent or caregiver their ability to use the products and to perform the tasks instead of relying on the parent or caregiver to observe and confirm that the child is performing the tasks correctly.

SUMMARY OF THE INVENTION

In one aspect, the invention is directed to a usage monitoring device for detecting usage of a personal hygiene product, a personal hygiene product package or a restroom facility, and for determining the appropriateness of the detected usage of the product, package or facility. The usage monitoring device may include at least one sensor configured to detect a physical stimulus associated with the usage of the product, package or facility with which the usage monitoring device is associated and to transmit a sensor output signal corresponding to the detected physical stimulus, an output device configured to generate a sensory perceptible output, and a controller operatively coupled to the at least one sensor and the output device. The controller may be programmed to receive the sensor output signals from the at least one sensor, and to determine whether the usage of the associated product, package or facility is an appropriate usage of the associated product, package or facility based on the sensor output signals received from the at least one sensor. The controller may further be programmed to cause the output device to generate a sensory perceptible output corresponding to an appropriate usage of the associated product, package or facility in response to determining that the usage of the associated product, package or facility was an appropriate usage.

In another aspect, the invention is directed to a method for detecting usage of a personal hygiene product, a personal hygiene product package or a restroom facility, and for determining the appropriateness of the detected usage of the product, package or facility. The method may include detecting a physical stimulus associated with the usage of the product, package or facility, determining whether the usage of the associated product, package or facility is an appropriate usage based on the detected physical stimulus, and outputting a sensory perceptible output corresponding to an appropriate usage of the associated product, package or facility in response to determining that the usage of the associated product, package or facility was an appropriate usage.

In a further aspect, the invention is directed to an interactive packaging system for monitoring the usage of a plurality of personal hygiene products, personal hygiene product packages, and restroom facilities. The interactive packaging system may include a plurality of usage monitoring devices each configured to detect physical stimulus associated with the usage of the product, package or facility with which the usage monitoring device is associate, and to transmit usage messages containing information relating to the detected physical stimulus. The interactive packaging system may further include a base station configured to receive the usage messages transmitted by the plurality of usage monitoring devices and to generate sensory perceptible outputs corresponding to the information contained in the usage messages. The interactive packaging system may be configured such that one of the usage monitoring devices and the base station is configured to determine whether the usage of the product, package or facility associated with a usage monitoring device is an appropriate usage based on the physical stimulus detected at the corresponding usage monitoring device.

Additional aspects of the disclosure are defined by the claims of this patent.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. In the accompanying drawing figures, like reference numerals identify like elements, which may or may not be identical in the several exemplary embodiments that are depicted. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
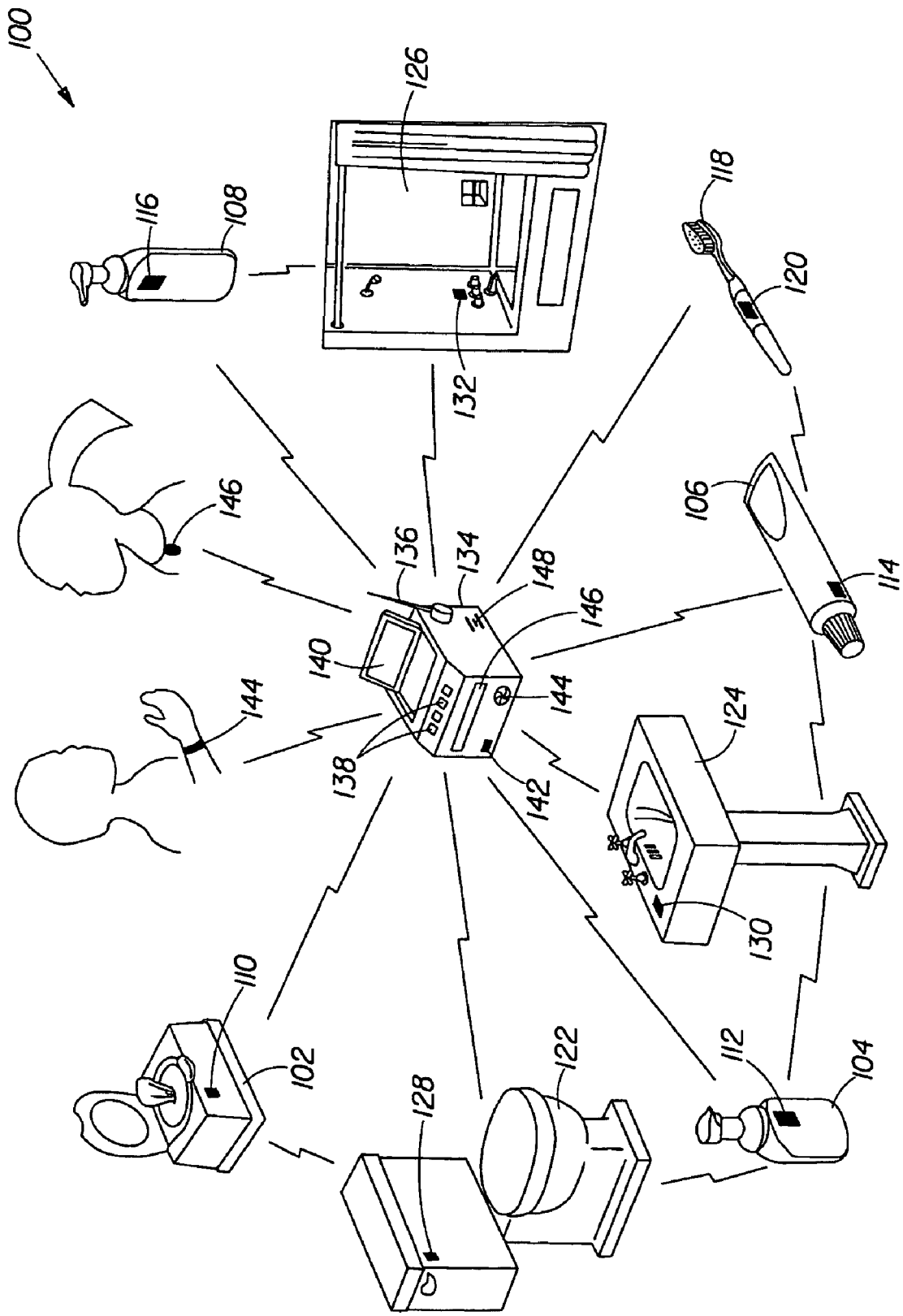
FIG. 1 personal hygiene products, facilities and a base station that may be implemented in an interactive packaging system in accordance with the invention.

FIG. 1 illustrates a sample implementation of an interactive packaging system 100 according to the present disclosure. The interactive packaging system 100 may be used to assist growing children in developing proper personal hygiene habits and the independent practice of those habits by providing the children with feedback regarding their progress in developing those habits, and to further allow the children to give feedback to their caregivers that they are capable of using the personal hygiene products appropriately. The term "caregiver" refers to a person other than the child, such as, a parent, babysitter, family member, teacher, day care worker, or other person who is able to provide sufficient assistance to the child to complete a personal hygiene task and to evaluate the child's ability to perform the personal hygiene task.

The interactive packaging system 100 may include a plurality of personal hygiene product packages 102-108 configured with usage monitoring devices 110-116, respectively, configured to sense the usage of the respective interactive packages 102-108 and/or the products contained therein. For example, the interactive packages 102-108 may be a hand wipes tub, a hand soap dispenser, and a shampoo dispenser, respectively. Interactive packages for other personal hygiene products, such as bath foams, conditioner, bubble bath and the like, may also be implemented in the system 100. The interactive packaging system 100 may further include additional personal hygiene products such as toothbrush 118 having corresponding usage monitoring device 120. In addition to the personal hygiene products themselves and, where appropriate, the product packaging, some implementations of the interactive packaging system 100 may further incorporate the in-home restroom facilities, such as a toilet 122, a sink 124 and a bathtub/shower 126, into the system 100 by providing corresponding usage monitoring devices 128, 130, 132, respectively, to facilitate complete monitoring and evaluation of the development of a child's personal hygiene habits.

In various embodiments of the interactive packaging system 100, the products and facilities discussed above may individually monitor their usage in order to determine the appropriateness of their usage, and/or the products and facilities may be further configured to communicate with each other in order to evaluate the child's success in completing each of the steps of a given personal hygiene task. For example, during toilet training, the monitoring devices of the toilet 122, wipes tub 102, hand soap dispenser 104 and sink 124 may communicate to ensure that children wipe themselves, if necessary, flush and wash their hands. If the monitoring device 128 detects that a child sat on the seat of the toilet 122, the device 128 may transmit a message notifying the monitoring device 110 of the wipes tub 102 that usage should occur within a predetermined period of time and before the toilet 122 is flushed. Upon actuation of the toilet 122, the monitoring device 128 may detect flushing of the toilet and transmit corresponding signals notifying the wipes tub 102 that usage should have occurred if the child sat on the toilet 122, and notifying the hand soap dispenser 104 that usage should occur within a specified period of time. If the monitoring device 110 of wipes tub 102 has detected the appropriate dispensing of wipes, the monitoring device 110 may provide feedback to the child that the wipes were used appropriately. Subsequently, when the usage monitoring device 112 of the hand soap dispenser 104 detects the dispensing of hand soap, the device 112 may transmit a message to the sink 124 indicating that the faucet should be turned on within a specified period of time so that the child may wash off the hand soap. Additional examples of the interaction between the personal hygiene products and the restroom facilities will be discussed hereinafter, in particularly in relation to FIGS. 3 and 4.

In some implementations of the interactive packaging system 100, it may be desirable to collect and control information regarding the usage of the various personal hygiene products 102-108, 118 and facilities 122-126 in a central location. In particular, the information may be collected and compiled, and subsequently displayed in an appropriate medium to the children to allow the children to monitor their progress in developing their personal hygiene habits. In such implementations, the interactive packaging system 100 may further include a base station 134 configured to receive and/or exchange communications with the various components of the interactive packaging system 100, and to compile and evaluate the information for subsequent reporting to the children and their caregivers. Depending on the requirements of the base station 134, the base station 134 may include a communication device, such as antenna 136, for communicating with the other components of the system 100, input devices, such as buttons 138, touchscreen 140, a keyboard, sensor 142, microphone 144 and the like, for inputting information into the base station 134 for use by the system 100, and output devices, such as touchscreen 140, printer 146, speaker 148 and the like, for communicating feedback to the children on their performance of the personal hygiene tasks.

In other implementations of the interactive packaging system 100, it may be desirable to monitor the development of the personal hygiene habits of multiple children who may be at various stages of development. In such implementations, the interactive packaging system 100 may be configured to separately monitor and provide feedback on the development of the habits of each child. In order to monitor the habits of each child, various mechanisms may be implemented within the interactive packaging system 100 to distinguish between the users of the personal hygiene products and facilities. In various implementations, the system 100 may be capable of simultaneously monitoring certain activities wherein the nature of the activity may allow the system 100 to discern which child is performing an act. For example, the system 100 may be able to discern which child is performing the task of brushing their teeth based on a unique identifier for each toothbrush 118 that is communicated to the base station 134 during use. For those tasks and implementations where the user is not readily discernible, the system 100 may be configured with other mechanisms for distinguishing between users.

In one implementation, the buttons 138 at the base station 134 may be configured to correspond to different children within the system 100. Consequently, when one of the buttons 138 is selected, the base station 134 may monitor and compile all the information transmitted by the personal hygiene products and facilities of the system 100 together until another one of the buttons 138 is selected to indicate the monitoring of a different child within the system 100. As another alternative, each of the children to be monitored by the system 100 may be given an item having a device with a unique user identification indicator allowing the system 100 to determine which child is being monitored by the system 100 without direct input from the children. For example, the system 100 may include articles of jewelry, such as wristbands 144 and necklaces 146, that are distributed to and worn by the children, with each article containing a device to communicate a unique identifier for the child that is detected by the base station 134 and/or the other components of the system 100 when the child is utilizing the components of the system 100. As a further alternative, the base station 134 may be configured to determine who is using the restroom using other technologies, such as motion detection and voice recognition. In one embodiment, the base station 134 may be disposed in the restroom and include motion sensor 142 to detect when a person enters the restroom. Upon detecting motion in the restroom at the motion sensor 142, the base station 134 may broadcast a prompt, such as "Who is there?" from the speaker 148, and await a response. The person in the restroom may then respond by stating their name, and the microphone 144 may detect the person's response. The base station 134 may be programmed with voice recognition software that may be configured to identify the person responding to the prompt based on the name stated by the respondent, or by the characteristics of the respondent's voice. If the base station 134 determines the respondent to be one of the children for which the system 100 is configured to monitor, the base station 134 may broadcast a greeting from the speaker 148, and begin monitoring the usage of the components of the system 100 by the responding child. If the respondent is not recognized, or is recognized to be a parent, an unmonitored sibling, a caregiver or other unmonitored user of the restroom, the system 100 may be configured to cease performing the monitoring and evaluation functions until a different person is detected in the restroom.

The collection of components of the interactive packaging system 100 illustrated in FIG. 1 is exemplarily only, and various combination of components, and individual usage of the components, is contemplated by the inventors and will be dictated by the particular implementation of an interactive packaging system 100. Various alternative embodiments are discussed further herein as additional examples of the interactive packaging system 100, but those skilled in the art will understand the further additional and alternative embodiment may be implemented in accordance with interactive packaging systems in accordance with the disclosure.

While FIG. 1 illustrates generic representations of the components of the system 100, those skilled in the art will understand that the components of the system 100 may be implemented with a consistent iconographic theme as part of the integrated approach to assisting the children in the development of their personal hygiene habits. To implement the theme, the products and product packaging, the monitoring devices for the facilities, the base station and the feedback elements may be configured so as to provide a visual and/or sensory representation of the theme and to link the various components together within the theme. The configurations of the various components may all relate to a particular animal or grouping of animals, to a real or fictional character or characters, or to any other child-friendly figure providing a consistent theme that may draw children's attention and interest in using the components of the system. For example, the base station 134, which may be the central feature of the system 100, may be configured with the appearance of the central character of the theme, such as a real or anthropomorphic animal, a child-friendly person, a fictional character or the like. Correspondingly, the other components of the system 100 may be shaped or decorated in a consistent manner with the base station 134 and the overall theme of the system 100.

Figure 2:
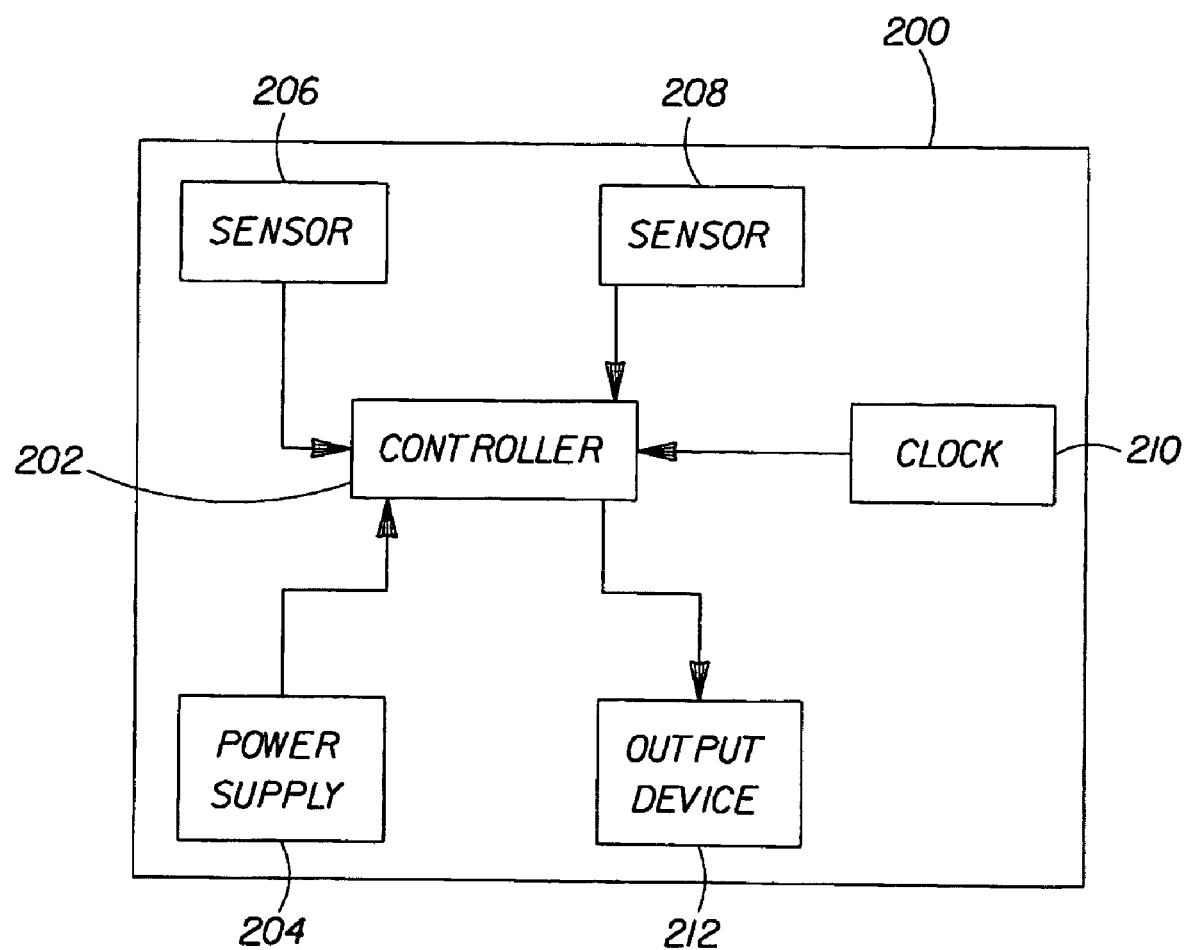
FIG. 2 is a functional block diagram of the electronic components of an individual interactive personal hygiene product package in accordance with an embodiment of the invention.

In some implementations of the interactive packaging system 100, the usage monitoring devices of the personal hygiene products and restroom facilities may be self-contained such that each component may independently detect usage of the personal hygiene product or restroom facility, evaluate the detected usage to determine whether the use is appropriate, and to provide a sensory perceptible output indication regarding the propriety or impropriety of the use of the product or facility. Referring to FIG. 2, an embodiment of usage monitoring device 200 that may be implemented with a personal hygiene product or restroom facility in an interactive packaging system is illustrated. The usage monitoring device 200 may include a controller 202, power supply 204, one or more sensors 206, 208, a clock 210 and an output device 212. The controller 202 may be implemented in any known and commonly used electrical components necessary for storing and executing the program logic necessary for implementing the processing required for the device 200 for a particular product or facility, and for communicating with and controlling the other components 204-212 of the usage monitoring device 200. For example, the controller 202 may be implemented on a printed circuit board and contain the circuitry necessary to receive and process input signals from the sensors 208, 206 and clock 210, to evaluate the received signals to determine the appropriateness of the use of the corresponding product, package or facility, and to transmit signals to the output device 212 causing the device 212 to provide the appropriate output to a child using the product, package or facility. It should also be appreciated that more complex implementations of the usage monitoring device 200 may be implemented wherein the controller 202 may comprise, among other components, a program memory, a microcontroller or microprocessor (MP), a random-access memory (RAM), read-only memory (ROM), and an input/output (I/O) circuit, all of which may be interconnected. It should be appreciated that the controller 126 may include multiple microprocessors. Similarly, the memory of the controller 126 may include multiple RAMs and multiple program memories, depending on the complexity and requirements of a specific implementation. It should also be appreciated that the I/O circuit may include a number of different types of I/O circuits, such as sound generation circuits, video generation circuit, odor generation circuitry, and the like. The RAM(s), ROM(s) and program memories may be implemented as semi-conductor memories, magnetically readable memories, and/or optically readable memories, for example. Depending on the implement in controller 202 and other components of the device 200, the power supply 204 may be any appropriate power source, such as batteries, photo cells, wall outlets and the like.

The sensors 206, 208 may be any appropriate sensing device for detecting a physical stimulus associated with a manipulation or use of the associate personal hygiene product, interactive package or facility that is necessary for determining the appropriateness of the use. While two sensors 206, 208 are illustrated in FIG. 2, those skilled in the art will understand that the monitoring device 200 may include as few or as many sensors as are necessary to evaluate the appropriateness of the use. For example, in order to determine the appropriateness of the use of the wipes tub 102 of FIG. 1, it may be desired to sense the opening and closing of the lid of the tub 102, and to sense the dispensing of the wipes from the tub 102. In this example, the sensor 206 may be an appropriate switch, proximity sensor, light sensor, or pressure sensor to detect when the lid of the tub 102 is opened or closed and to transmit a corresponding signal to the controller 202. For the dispensing of wipes, the sensor 208 may be any of a variety of sensors capable of detecting the dispensing or removal of wipes from the tub 102 as well as detecting the number of wipes removed, if desired. For example, sensor 208 may be a strain gauge, pressure sensor, switch or other device capable of sensing pressure or strain on the tabs or membrane through which the wipes are pulled as the force is applied by the child or other user to dispense a wipe through an opening of the tub 102. Alternatively, where the tub 102 contains a sufficiently low number of wipes such that the removal of a single wipe causes a measurable reduction in the weight of the stack of wipes, the sensor 208 may be a weight or pressure sensor configured to output a constant signal to the controller 202 proportional to the number of wipes stacked in the tub 102, or a discrete signal to the controller 202 each time the weight of the stack changes due to the removal of a wipe. Depending on the sensors 206, 208 actually used in the wipes tub 102, the controller 202 is configured to receive the signals from the sensors 206, 208 and evaluate the signals to determine the appropriateness of the use of the wipes tub 102, an example of which is discussed more fully below.

Unlike the wipes tub 102 example, the monitoring device 200 may only require a single sensor 206 when implemented to monitor the usage of the toilet 122. For example, it may be desired to monitor whether the handle of the toilet 122 is pulled far enough to flush the toilet when the handle is pulled at all by the child. In this case, the sensor 206 may be a sensor capable of detecting rotational displacement of the handle or shaft of the handle, and may provide an output signal to the controller 202 that is proportional to the amount of rotational displacement of the handle caused by the child. In such an implementation, the controller 202 may be configured to detect the output signal of the sensor 206, to compare the level of the signal to a prescribed minimum level required to indicate sufficient rotation of the handle for the toilet 102 to flush, and to cause the output device to provide a corresponding output depending on whether the handle was sufficiently rotated, or partially and detectably but insufficiently rotated.

As indicated above, the sensors 206, 208 may be any appropriate sensors for detecting physical stimulus associated with the usage of the personal hygiene product, interactive package or restroom facility. For example, manipulation of lids or caps, volume or level changes of liquids, and actuation of pumps on hand soap or shampoo dispensers may be detected by switches, such as pressure membrane switches, mechanical and magnetic float switches, capacitive switches, level switches, magnetic reed switches, radio frequency switches, and the like. Further, opening and closing of lids and caps may also be detected by photodiode, phototransistor, photosensor and other types of light sensors. Accelerometers, such as inertial gyro and piezoelectric accelerometers, may be implemented in toothbrushes to detect the movement of the toothbrushes while children brush their teeth. As discussed above, strain gauges and pressure sensors, such as bellows, analog and digital pressure gauges, piezoresistive and capacitive pressure sensors and load cells may be implemented to detect the application of forces causing tension, strain, shear, weight and pressure increases, pump movement and the like. Changes in linear position, such as in the movement of a dispensing pump, may be detected by laser micrometers, position displacement and ultrasonic sensors, linear variable displacement transducers (LVDTs), magnetostrictive, inductive, capacitive and variable resistance linear position sensors, linear potentiometers, and the like. Still further, the relative location of the products, packaging, facilities and users within the system 100 may be detected by proximity sensors, such as capacitive, ultrasonic, photoelectric and inductive proximity sensors. While the above list is extensive, it is not meant to be exhaustive. Other sensing device appropriate for detecting a particular physical stimulus will be apparent to those skilled in the art and are contemplated by the inventors as having use in monitoring circuits of the interactive packaging systems 100 in accordance with the disclosure.

For many of the personal hygiene products, interactive packages and facilities, a timing element is present in the evaluation of the propriety of usage. For example, once the lid of the wipes tub 102 is opened or the cap of the toothpaste tube 106 is removed, the lid must be closed or the cap must be replaced within a specified amount of time to indicate that the child remembered to close the corresponding container and prevent the product from drying out. In these implementations, the clock 210 may be included in the monitoring device 200 to input a time signal to the controller 202, and the controller 202 may be configured to initiate a timer and to use the time signal when the appropriate sensor detects the opening of the package.

Where the interactive packaging system 100 is implemented without communication between the components and/or a base station, it is likely desired to provide an indication of the appropriateness of the use a personal hygiene product or facility at the component of the system 100. As a result, the output device 212 is provided in the monitoring circuit 200 and operatively connected to the controller 202 to receive signals from the controller 202 causing the output device 212 to produce a specified sensory perceptible output. The output device 212 may be any appropriate device for conveying the desired sensory perceptible output. For example, the output device 212 may be a speaker or other audible output device capable of producing audibly perceptible outputs. The controller 202 may be configured with the necessary logic and sound generation data for producing verbal messages, songs, animal noises and the like corresponding to the outcome of the evaluation of the signals from the sensors 206, 208 performed by the controller. For example, the controller 202 may be configured to cause a speaker to output a personalized verbal or musical message to the child corresponding to the appropriate or inappropriate use of the monitored product, package or facility. These messages may be prerecorded by the manufacturer, or the devices 200 may further include a microphone operatively coupled to the controller 202 such that a child or caregiver may record messages that are stored by the controller 202 and later used at the appropriate time when the child is using the product, package or facility. Still further, where multiple children are monitored by the device 200, the controller 202 may be configured to provide distinct feedback messages for each of the children during use.

Alternatively, the output device 212 may be a visual output device or devices, such as a light bulb or bulbs, a single or multi-color light emitting diode (LED), a liquid crystal display (LCD), and LED display, and the like, capable of producing visual outputs, with the controller 202 being configured with the necessary logic and visual display generation data for producing visual outputs corresponding to the outcome of the evaluation of the use of the corresponding component of the system 100. As a further alternative, the output device 212 may be a dispensing device capable of dispensing a tangible article indicative of a child's performance in using the product, package or facility. When a usage is appropriate, the controller 202 may be configured to cause the output device 212 to dispense a corresponding token or chit, such as gold stars, coins, tickets, coupons or other tangible article signifying to the child and confirming for the caregiver that the product, package or article was used appropriately. In addition to dispensing existing physical articles as described, it is further contemplated that the output device 212 may be a device such as a printer that generates or creates the dispensed item at the time of usage by the child. As with the sensors, the output devices in addition to those specifically identified herein may be implemented in the monitoring circuit 200 for producing the desired audibly or visually perceptible outputs, or other types of sensory perceptible outputs relating to the senses of smell, feel and taste, if desired.

As discussed above, the usage monitoring device 200 may be implemented in many or all of the person hygiene products, interactive packaging and facilities of the system 100. For example, usage monitoring device 200 implemented in the wipes tub 102 may be configured to detect and evaluate the opening and closing of the lid, and the dispensing of the wipes of the tub 102 for appropriateness of use. In one implementation, the device 200 may be configured to determine that the tub wipes 102 has been used appropriately if the lid is opened, at most two wipes are dispensed from the tub 102, and the lid is closed within a predetermined period of time. When the lid of the tub 102 is opened, the sensor 206 may detect the opening of the lid and transmit a signal indicative of the opening to the controller 202. In response to receiving the signal from the sensor 206, the controller 202 may initiate a timer and use the time signal from the clock 210 to begin counting down the predetermined time within which the lid must be closed. The controller 202 may also initialize a counter that will correspond to the number of wipes dispensed from the tub 102 since the lid was opened.

As the child pulls wipes from the tub 102, the sensor 208 may detect the removal of the wipes and transmit a corresponding signal to the controller 202. As the controller 202 receives the signals from the sensor 208, the controller 202 may increment the counter to reflect the number of wipes that have been removed from the tub 102. When the lid of the tub 102 is closed, the sensor 206 may detect the closing of the lid and transmit a corresponding signal to the controller 202. Upon receiving the lid closing signal from the sensor 206, and if the counter indicates that no more than the maximum allowable number of wipes have been removed and the predetermined period of time as indicated by the timer has not elapsed, the controller 202 may transmit signals to the output device 212 to cause the output device 212 to produce an output indicative of the appropriate usage of the wipes tub 102 by the child. Conversely, failure to remove any wipes or removing more than the maximum allowable number of wipes, or failure to close the lid within the predetermined period of time may cause the controller 202 to determine that the wipes tub 102 has not been used properly, and to transmit signals to the output device 212 to cause the output device 212 to produce an output indicative of the inappropriate usage of the wipes tub 102 by the child. Depending on the implementation, the controller 202 may be configured to cause the same output for all conditions of inappropriate use, or to cause a distinct output for each condition of inappropriate use, i.e., removing too few wipes, removing too many wipes, and not closing the lid within the predetermined period of time.

The usage monitoring device 200 may be implemented in a similar manner in the toothpaste tube 106 of FIG. 1, with sensor 206 detecting the removal and replacement of the cap and sensor 208 detecting the volume of toothpaste dispensed through the opening of the tube 106. The controller 202 may perform the same basic evaluation process as described above for the tub 102, and determine appropriateness of usage of the toothpaste tube 106 by evaluating the length of time between removing and replacing the cap, and whether too little or too much toothpaste is dispensed. Instead of a counter, the controller 202 may store the cumulative volume of dispensed toothpaste as signals are received from the sensor 208, and be configured with predetermined maximum and minimum allowable volumes or masses against which to compare the amount of dispensed toothpaste.

The usage monitoring device 200 may be implemented in a slightly different manner in the hand soap dispenser 104 and shampoo dispenser 108 of FIG. 1. Instead of a lid or a cap, the dispensers 104, 108 may include pumps that are depressed to dispense an amount of the liquid stored therein. With the dispensers 104, 108, the appropriate usage may be dispensing the correct amount within a predetermined period of time, such as fifteen seconds. In one embodiment, the device 200 may include only sensor 206 configured to detected the movement of the pump of the dispenser 104, 108, and to transmit a signal to the controller 202 having a magnitude or value corresponding to the length of travel of the pump during the stroke. Correspondingly, the controller 202 may be configured to convert the signal from the sensor 206 into a volume of liquid dispensed from the pump. The controller 202 may be further configured to initiate a timer upon first receiving a signal from the sensor 206 indicating the first actuation of the pump. As the first and subsequent signals are received from the pump, the controller 202 may store the total amount of liquid dispensed from the dispenser 104, 108. At the expiration of the timer after the predetermined period of time, the controller 202 may compare the total amount of liquid dispensed within the predetermined period of time to the minimum and maximum allowable amounts of dispensed liquid. Depending on the outcome of the comparison, the controller 202 may transmit signals to the output device 212 to cause the output device 212 to produce an output indicative of the appropriate or inappropriate usage of the dispenser 104, 108 by the child. In an alternate embodiment, the device 200 may be implemented with the sensor 206 detecting the actuation of the pump, and the sensor 208 detecting the volume of liquid being dispensed from the pump on each stroke. The criteria for appropriateness of the usage of the dispensers 104, 108 may be the same, but the controller 202 in this embodiment may be configured to initiate the timer in response to receiving a first signal from the sensor 206, and to determine the accumulated amount of dispensed liquid based on the signals from the sensor 208.

As previously discussed, the usage monitoring device 200 may also be implemented in personal hygiene products such as the toothbrush 118 to determine the appropriateness of their usage. In this example, appropriate usage of the toothbrush 118 may be evaluated based both on the usage of the product in an individual instance of usage, and on the frequency or number of instances of usage in a particular timeframe, such as twice daily. For an instance of usage, the toothbrush 118 may be used appropriately if the child brushes for at least a minimum amount of time, and brushes in the appropriate direction, such as up-and-down instead of side-to-side. For frequency of usage, the toothbrush 118 may be used appropriately if the child brushes at least twice on a given day, including once in the morning and once in the evening. In order to detect the usage of the toothbrush 118, the device 200 may include sensor 206 in the form of an accelerometer configured to detect the up-and-down movement or rotational movement of the toothbrush 118 about its longitudinal axis, and sensor 208 in the form of an accelerometer configured to detect the side-to-side movement of the toothbrush 118 parallel to its longitudinal axis. The device 200 may also be implemented in and electric toothbrush, such as with the controller 202 receiving and using a signal from the motor of the toothbrush to evaluate the duration of usage, and with appropriate sensors to detect the movement and/or orientation of the electric toothbrush as necessary for the controller 202 to evaluate the usage which the toothbrush is turned on. Additionally, the controller 202 may be configured to detect the first instance of receiving a signal from either of the sensors 206, 208 when the child begins brushing his or her teeth and to increment a counter indicative of the number of usages of the toothbrush 118 for that day by the child, to determine the elapsed time between the detection of the first signal and last signal from either of the sensors 206, 208, and to store, based on the signals received from the sensors 206, 208, the amount of time that the toothbrush 118 moved up-and-down during the instance of tooth brushing.

The controller 202 may be configured to use the time signal from the clock 210 to initialize the counter at the beginning of the day. For example, at midnight each day according to the time signal, the controller 202 may initialize the daily usage counter. After each usage of the toothbrush 118, the controller 202 may determine whether the toothbrush 118 was used at least the predetermined minimum period of time, and whether the toothbrush 118 was moved in the appropriate direction for a sufficient portion of the time it was used. If the usage is determined to be appropriate, the controller 202 may transmit signals to the output device 212 to cause the output device 212 to produce an output indicative of the appropriate usage of the toothbrush 118, otherwise an inappropriate usage indication is output. Further, if the daily usage counter is at least equal to the predetermined minimum number of daily usages, the controller 202 may further transmit signals to the output device 212 to cause the output device 212 to produce an output indicative of the appropriate number of usages of the toothbrush 118 by the child.

Various alternatives exist for monitoring the usage of the toothbrush 118, storing information relating to the daily usage of the toothbrush 118, and displaying the outcome of the evaluation of each use of the toothbrush 118 during the day. For example, the controller 202 of the toothbrush 118 may be configured to store information regarding the appropriateness of the usage for each instance of usage of the toothbrush 118 in a given day. Moreover, the device 200 of the toothbrush 118 may include multiple output devices, perhaps equal to the minimum number of instances of usage of the toothbrush required for a given day, such as multi-color LEDs. Each time the toothbrush 118 is used during the day, the controller 202 may evaluate the usage of the toothbrush 118, store the result of the evaluation, and cause a corresponding one of the LEDs to illuminate a color corresponding to the outcome of the evaluation. In one embodiment, the color coding of the LEDs may be reflective of the level of achievement or a grade for the instance of usage. Consequently, one color may be illuminated if the child brushes properly for the required duration and with the proper orientation or movement. Different colors may signify brushing long enough but with improper movement, and brushing with the proper movement but for too short of a period of time. A further color may signify that the child brushed, but did not brush long enough and did not orient or move the toothbrush properly. Once the toothbrush 118 is used and an LED is illuminated, the LED may remain illuminated for the remainder of the day so that the child or caregiver may readily determine at the end of the day how many times the toothbrush 118 was used during the day, and whether the toothbrush 118 was used properly.

The usage monitoring device 200 may further be adapted to monitor and determine the appropriateness of usage of the restroom facilities within the interactive packaging system 100. Usage of the toilet 122 of FIG. 1, for example, may be appropriate if, once the child approaches the toilet 122, the toilet 122 is flushed within a predetermined period of time. To monitor usage of the toilet 122, the device 200 may include the sensor 206 in form of a proximity sensor configured to detect the arrival of the child at the toilet 122, and the sensor 208 configured to detect the flushing of the toilet 122, such as by detecting the manipulation of the handle or detecting the drop in the level of the water in the tank. Further, the controller 202 may be configured to initiate a timer in response to receiving a first signal from the sensor 206 indicating the approach of the child, and to evaluate the appropriateness of the usage of the toilet 122 by the child in response to receiving a subsequent signal either from the sensor 208 indicating that the toilet 122 has been flushed, or from the sensor 206 indicating that the sensor 206 no longer detects the presence of the child at the toilet 122. If the controller 202 detects the signal from the sensor 208 and the signal was detected within the predetermined period of time, the controller 202 may cause the output device 212 to produce an output indicative of the appropriate use of the toilet 122. If the controller 202 detects the signal from the sensor 206, or the signal from the sensor 208 was received after the predetermined period of time, the controller 202 may cause the output device 212 to produce an output indicative of the inappropriate use of the toilet 122 that may be specific to the reason that the usage was determined to be inappropriate. For example, where the subsequent signal from the sensor 206 is received, the controller 202 may cause the output device 212 to output an audible reminder to flush the toilet 122. The device 200 may similarly be implemented to monitor the usage of the sink 124 and bathtub/shower 126, with a sensor 206 detecting the opening and closing of the faucets, and the controller 202 being configured to evaluate the duration that the faucets are open against predetermined maximum and/or minimum periods of time that may be particular to the sink 124 and bathtub/shower 126.

In additional implementations of the interactive packaging system 100, the usage monitoring devices of the personal hygiene products and restroom facilities may be configured to communicate with each other to monitor the appropriateness of the performance of personal hygiene tasks requiring several steps involving the use of multiple of the products, packages and/or facilities of the system 100. For example, the task of using the bathroom may include the steps of using the toilet 122, wiping the genital or perianal regions with wipes from the tub 102, if necessary, and cleansing the hands by washing with hand soap from the dispenser 104 at the sink 124. To fully evaluate a child's success at performing this task, it may be desirable to have the monitoring devices of the toilet 122, tub 102 and dispenser 104 communicate such that the tub 102 and dispenser 104 are notified that the toilet 122 is being or has been used by the child, and that subsequent use of the tub 102 and the dispenser 104 should be expected and evaluated in addition to evaluating the usage of the tub 102 or dispenser 104 if in fact such usage occurs.

Figure 3:
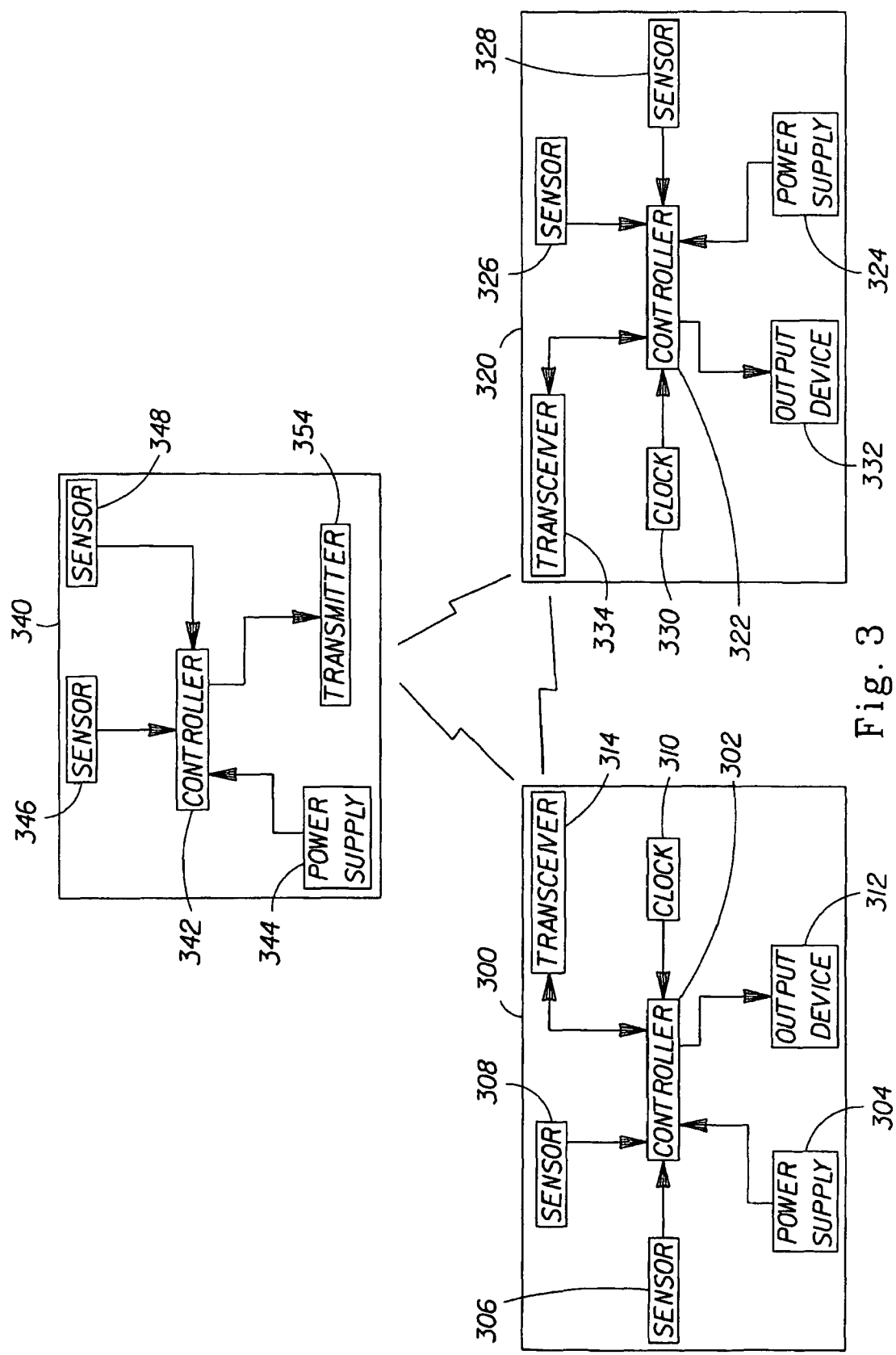
FIG. 3 is a functional block diagram of the electronic components of interactive personal hygiene product packages in a personal hygiene facility configured for package to package communications.

Referring to FIG. 3, an embodiment of usage monitoring devices 300, 320 and 340 that may implement interactive communications between the personal hygiene products, interactive packaging and restroom facilities in the interactive packaging system 100 is illustrated. The usage monitoring devices 300, 320 and 340 may each include similar components as the usage monitoring device 200 described above for evaluating the appropriateness of the usage of the corresponding product, package or facility. Consequently, the controller 302, power supply 304, sensors 306, 308, clock 310 and output device 312 of device 300, and the controller 322, power supply 324, sensors 326, 328, clock 330 and output device 332 of device 320 may be similar to the corresponding components as described above. In the illustrated embodiment, the usage monitoring device 340 may be configured for implementation on one of the restroom facilities, such as the toilet 122, and may be configured to detect flushing of the toilet 122 and a child sitting on the seat of the toilet 122. Consequently, the controller 342, power supply 344 and sensors 346, 348 may be similar to the corresponding components as described above, with the controller 342 being configured to detect a child sitting on the toilet 122 in response to a signal from the sensor 348, and to detect flushing of the toilet 122 in response to a signal from the sensor 346, but the controller 342 might not be configured to evaluate the appropriateness of the usage of the toilet 122. However, those skilled in the art will understand that device 340 may be configured in a similar manner as described above with respect to device 200 to monitor the usage of the toilet 122 or other facilities of the system 100, and to further provide the additional components and functionality for interactive communications as described hereinafter.

In addition to the previously-described components, the devices 300, 320 and 340 include additional components to facilitate communication of information between the devices 300, 320 and 340. Consequently, the devices 300, 320 may include transceivers 314, 334, respectively, operatively connected to controllers 302, 322, respectively, and configured to transmit messages to and receive messages from the other devices in the system 100. Similarly, the facility device 340 may include a transmitter 354 operatively connected to the controller 342 and configured to transmit messages to the other devices in the system 100. Because the device 340 only detects usage of the corresponding facility, the device 340 as illustrated is configured to transmit but not receive messages. However, it is contemplated that the device 340 may be configured to usage with certain facilities and in certain implementations, some of which are described below, wherein the device 340 may be configured with a receiver or transceiver to allow the device 340 to receive messages from other devices of the system 100. The transceivers 314, 334 and transmitter 354 may be any device such as those well known in the art for communicating information between electronic devices. Consequently, the transceivers 314, 334 and transmitter 354 may be connected by terrestrial links for communicating over hard wires, LANs or other physical networks, or by wireless communication technologies such as infra-red communications, radio frequency communications, radio frequency identification (RFID) tags (either passive or active), and the like.

Applying the devices 300, 320 and 340 to the interactive communication example discussed above, the devices 300, 320 may be implemented with the wipes tub 102 and hand soap dispenser 104, respectively, and the device 340 may be implemented with the toilet 122 to evaluate the completeness of a child's performance in the task of going to the bathroom. The devices 300, 320 may be configured to evaluate the appropriateness of the usage of the wipes tub 102 and dispenser 104, respectively, possibly in a similar manner as described above. The controller 342 of the device 340 may be configured to receive signals output by the sensors 346, 348 in response to detecting flushing of the toilet 122 and sitting on the seat of the toilet 122, respectively, by the child, and to cause the transmitter 354 to transmit messages to the devices 300, 320 notifying the devices 300, 320 that the toilet 122 has been flushed or sat upon. The message from the device 340 may be received by the devices 300, 320 at the transceivers 314, 324. The transceivers 314, 324 may then transfer the message to the controllers 302, 322, respectively. In order to appropriately perform this task, the child may be required to wipe the genital and/or perianal regions before flushing the toilet 122, and to cleanse his or her hands within a predetermined period of time after flushing the toilet 122. To evaluate the timeliness of performing these steps of the task, the controllers 302, 322 may be configured to initiate timers and/or evaluate further messages upon receiving the message from the device 340 for use in determining whether the child wipes before flushing and begins cleansing his or her hands within the predetermined period of time.

With respect to evaluating the appropriateness of the child's usage of the wipes tub 102 and hand soap dispenser 104, the devices 300, 320 may be configured in a similar manner as discussed above for the device 200. Additionally, the devices 300, 320 are configured to evaluate the timing of the usage in relation to the flushing of the toilet 122. To evaluate the execution and proper timing of wiping in response to a message from the controller 340 indicating that a child is sitting on the toilet 122, the controller 302 may be configured to compare the timing of the receipt of a message indicating that a child is sitting on the toilet 122 from the device 340 to the receipt of a signal from the sensor 308 indicating the dispensing of wipes from the tub 102. The timing may be determined to be appropriate if the signal from the sensor 308 is received by the controller 302 before receiving a toilet flushing message from the device 340. The controller 322 may be configured to compare the elapsed time between the receipt of the toilet flushing message from the device 340 to the receipt of a signal from the sensor 326 indicating the depressing of the pump of the dispenser 104. The controllers 302, 322 may further be configured to cause the output devices 312, 332, respectively, to generate an output corresponding to the evaluation of the timing of dispensing wipes by the controller 302, and of the elapsed time at the controller 322, respectively, either at the time of first usage of the tub 102 or dispenser 104 or after the predetermined period of time elapses, or after the evaluation of the appropriateness of the usage of the tub 102 or dispenser 104.

Where both hand soap and hand wipes are available, the devices of the packages for both products may receive the toilet flushing message from the device 340 and await usage by the child. Because the child may choose to use either the hand wipes or the hand soap to cleanse their hands, it is likely that only one of the devices will detect usage of the corresponding package after the toilet is flushed. Therefore, in order to prevent the device of the unused product from unnecessarily evaluating the failure of the child to use the product, the controllers of the devices may be configured to cause their respective transceivers to transmit a message indicating that the child has begun using the product upon detecting the initial signal from a sensor. Upon receiving the message from the transceiver of the device detecting usage, the device of the unused package may stop the initial usage timer and cease evaluating the elapsed time since the toilet 122 was flushed.

The interactive communications may also be implemented in the other components of the system 100 to further supplement the monitoring of performance of the personal hygiene tasks by the children. For example, the devices 300, 320 may be implemented with the toothpaste tube 106 and toothbrush 118, respectively, such that the device 300 may transmit a message to the device 320 when toothpaste is dispensed from the toothpaste tube 106 and, upon receipt of the message, the device 320 may evaluate whether the child uses the toothbrush 118 within a predetermined period of time after the toothpaste is dispensed. The device 320 may further be configured to determine an instance of inappropriate usage where the toothbrush 118 is used without first receiving a toothpaste dispensing message from the device 300 of the toothpaste tube 106. The sink 124 may also be integrated by implementing a device 300, 320 configured to interact with the usage monitoring devices of the toothpaste tube 106, toothbrush 118 and the hand soap dispenser 104 as described above. Upon the dispensing of toothpaste from the tube 106 or hand soap from the dispenser 104, the corresponding usage monitoring devices may transmit messages to the usage monitoring device of the sink 124 indicating the dispensing of the product. Upon receiving these messages, the usage monitoring device of the sink 124 may initiate a timer and evaluate the elapsed time to open the faucet, close the faucet, or both, with respect to predetermined periods of time specified for the appropriate usage of the sink 124 for the particular personal hygiene tasks being performed by the child. Those skilled in the art will understand that similar interactive usage monitoring devices may be implemented in the other products, packages and facilities of the system 100 such as, for example, the shampoo dispenser 108 and bathtub/shower 126.

Figure 4:
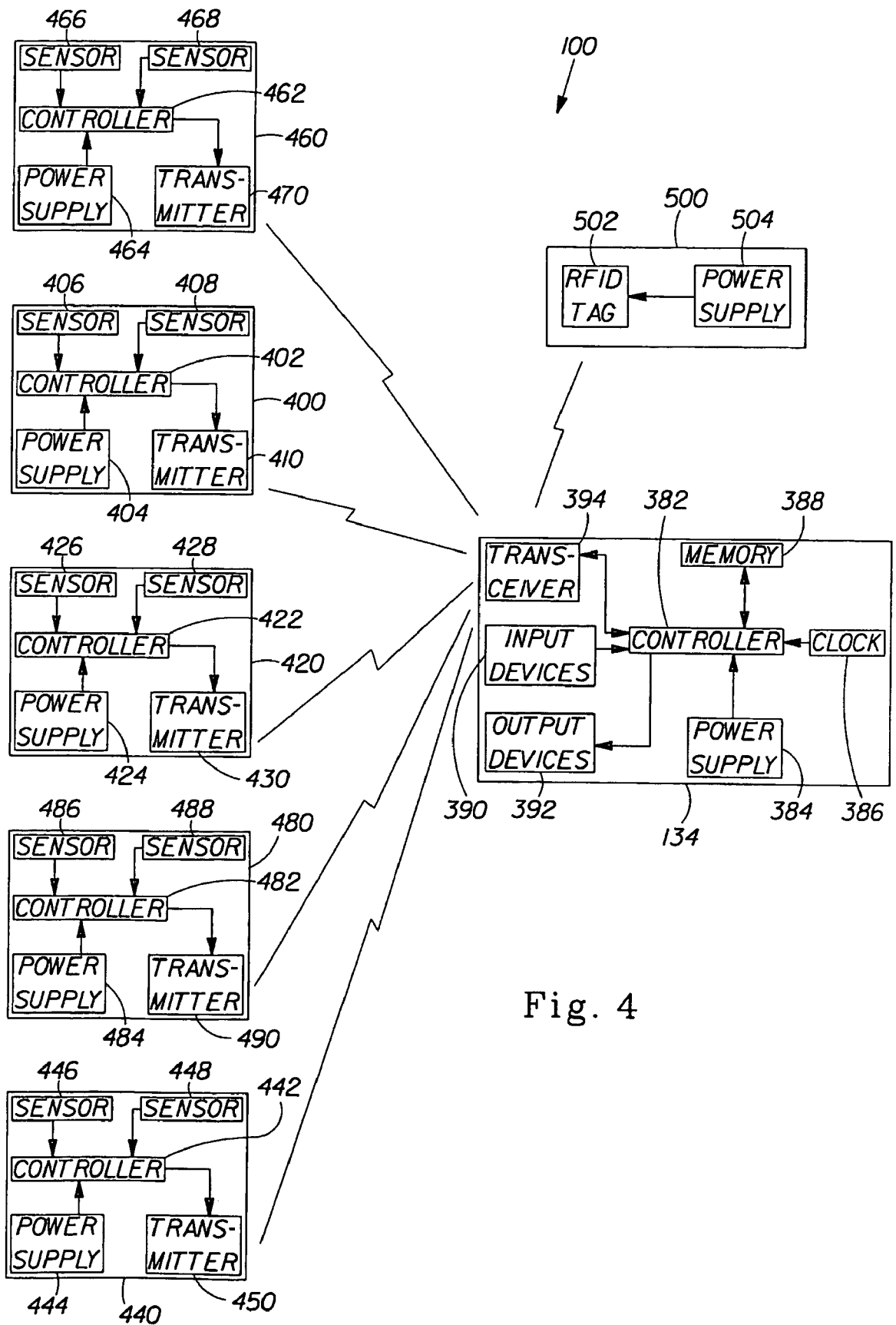
FIG. 4 is a functional block diagram of a configuration of interactive personal hygiene product packages, personal hygiene facilities, and a base station of an interactive packaging system in accordance with the invention.

The interactive communications may be further enhanced, and integration and centralization of the interactive packaging system 100 may be implemented by providing the central base station 134 as shown in FIG. 1 to communicate with the components of the system 100 for integrated evaluation of all of the product, package and facility usage within the system 100. FIG. 4 illustrates an embodiment of an implementation of a central base station 134 configured for interactive communications with usage monitoring devices 400, 420, 440, 460 and 480 that may monitor the usage of, for example, the wipes tub 102, hand soap dispenser 104, shampoo dispenser 108, toilet 122 and bathtub/shower 126, respectively. In the illustrated embodiment, the system 100 is configured so that the majority of the processing and usage evaluation, such as the usage evaluation processing described in the various examples above, is centralized at the base station 134, and with the usage monitoring devices 400, 420, 440, 460 and 480 being configured to detect the usage of the various components via the corresponding sensors, and to transmit messages corresponding to the detected usage to the base station 134 for further processing. This is one exemplary embodiment of the distribution of the processing in the integrated interactive packaging system 100, and those skilled in the will understand that the processing may be distributed among the components of the system 100 in any desired manner. Various alternative processing distributions within the system 100 will be discussed further below.

The base station 134 may include a controller 382, power supply 384 and clock 386 that may be similar to the corresponding components of the usage monitoring devices discussed previously. Because the processing requirements of the centralized base station 134 may be substantially greater than the requirements for the individual usage monitoring devices, the controller 382 may have a corresponding greater processing capacity than the controllers of the usage monitoring devices. The base station 134 may further include memory 388 operatively connected to the controller 382. The memory 388 may be any appropriate storage device that may store instructions that are executable by the controller 382 to perform the functionality of the base station 134, and data necessary for the performance of the functionality of the base station 134.

The base station 134 may also include one or more input devices 390 and one or more output devices 392 as necessary to receive and output information necessary to the performance of the functions of system 100. The input devices 390 may include any appropriate device for inputting information at the base station 134 such as, for example, buttons 138, touch screen 140, motion sensor 142 and microphone 144 as shown in FIG. 1, a keyboard, other voice or light recognition devices, and the like. Similarly, the output devices 392 may include any appropriate device or devices for outputting information relating to the evaluation of the usage of the components of the system 100 such as, for example, touch screen 140, printer 146 and speaker 148 of FIG. 1, other types of monitors or display devices, various types of illumination sources, other devices for dispensing tangible articles, or any other type of output devices capable of outputting a sensory perceptible output capable of conveying the information to be output by the base station 134. In order to facilitate the interactive communications with the other components for the system 100, the base station 134 may further include a transceiver 394, which may be similar to the transceivers 314, 334 discussed above and capable of transmitting signals to and receiving signals from the other components of the system 100.

Those skilled in the art will understand that the base station 134 and its components may be implemented in any appropriate device capable of performing the functions of the base station 134 as discussed herein. In some implementations, the base station 134 may be implemented in currently known and available processing device. For example, the base station 134 may be implemented at a personal computer, personal digital assistant (PDA) or other processing device on which software for performing the functionality of the base station 134 may be loaded. Alternatively, the base station 134 may be implemented in a custom designed processor configured specifically for use in the system 100. Further, the base station 134 may be configured for additional uses or with additional functionality beyond that necessary to perform the usage monitoring and evaluation functions. For example, the base station 134 may also function as a radio, a CD and/or DVD player, a VCR, a personal computer or PDA device, a wireless network station, or other devices that may be beyond the scope of providing feedback in the instructive packaging system 100.

Because the processing for the system 100 is centralized at the base station 134 in this embodiment as discussed above, the usage monitoring devices 400, 420, 440, 460 and 480 may be simpler than those described above. For example, the usage monitoring device 400 may include a controller 402, power supply 404, sensors 406, 408 and transmitter 410 similar to those described above. The devices 420 and 440 may have similar configurations of components 422-430 and 442-450, respectively. Since the evaluation processing is performed at the base station 134, the controllers 402, 422, 442 may be configured to cause the transmitters 410, 430, 450, respectively, to transmit messages to the transceiver 394 of the base station 134 corresponding to the signals from the sensors of the devices 400, 420, 440 when usage of the tub 102 or dispensers 104, 108 is detected. The usage monitoring devices 460, 480 may be configured in a similar manner as the device 340 discussed above with similar components, and the controllers 462, 482 configured to cause the transmitters 470, 490 to transmit messages to the transceiver 394 of the base station indicative of usage of the toilet 122 or bathtub/shower 126 by the child.

The interactive packaging system 100 may have varying combinations of products, packages and facilities available and configured with usage monitoring circuitry to monitor and evaluate the usage of the components of the system 100. Consequently, it may be desirable for the base station 134 to determine which components are available and active for monitoring usage. In one embodiment, the base station 134 may include a bar code reader configured to read the bar code labels, such as UPC labels, with the controller 382 configured to determine the type of product from the scanned label and to anticipate and detect messages from the monitoring device of the product. Alternatively, the controllers 402, 422, 442, 462 and 482 may be configured to regularly cause the transmitters 410, 430, 450, 470 and 490 to transmit messages indicative of the presence of the devices that are received by the base station 134. Still further, the controller 382 may be configured to periodically broadcast a polling message that, when received at a usage monitoring device within the system 100, causes a response message to be transmitted by the devices alerting the base station 134 of their presence in the system 100. Functionality for compensating for missing components of the system 100 is discussed further below.

The controller 382 of the base station 134 is configured to perform the usage evaluation processing for the products, packages and facilities of the system 100, such as processing discussed above in relation to FIG. 2, and to perform the evaluation processing corresponding to the interactive communications within the system 100, such as that discussed above in relation to FIG. 3. The messages transmitted by the transmitters 410, 430, 450, 470 and 490 may include information identifying the type of product, package or facility on which the corresponding device 400, 420, 440, 460 and 480 is implemented and is monitoring, the type of sensor, usage or stimulus being monitored, and a value corresponding to the sensor signal detected at the controllers 402, 422, 442, 462 and 482. For example, when the sensor 406 detects the opening of the lid of the wipes tub 102, the controller 402 causes the transmitter 410 to transmit a message with information indicating that usage of a wipes tub is being monitored, that the message regards the detection of the opening or closing of the lid, and that the lid has been opened. Similarly formatted messages will be transmitted by other devices 420, 440, 460 and 480 in response to the detection of usage at the corresponding sensors.

Upon receiving the messages from the devices 400, 420, 440, 460 and 480, the controller 382 of the base station 134 may execute the corresponding usage evaluation logic to determine the appropriateness of the usage of the corresponding product, package or facility. When each usage evaluation is complete, the controller 382 may cause one or more of the output devices 392 to produce a sensory perceptible output corresponding to the outcome of the evaluation in a similar manner as discussed above for the output devices of the usage monitoring devices disposed at the product, package or facility.

Because the base station 134 has access to information relating to each instance of usage of the components of the system 100, the base station 134 may be further configured to store historical information regarding the child's performance of the various person hygiene tasks, and to compile the information into summaries for evaluating the child's performance over a period of time. Such information may be helpful in identifying tasks for which the child has developed the necessary level of skill to perform the tasks independently and without further monitoring, and in identifying those tasks where the child may require additional training, supervision and/or repetition to properly perform the task independently. The controller 382 may be configured to store information relating to each instance of usage or performance of a task, along with information regarding the success or failure of the child, in memory 388. The information may include the date and time that the usage or task occurred, an identification of the usage or task, an indication of the outcome of the evaluation of the usage or task and, if the usage was inappropriate or the task was performed incorrectly, an indication of the reason why the child was unsuccessful.

As an example, in an instance of a child taking a shower, the base station 134 may receive messages from the devices 440 and 480 indicative of the child dispensing shampoo from the dispenser 116, and turning the faucets of the bathtub/shower 126 on and off. Where implemented, the base station 134 may also receive messages from a usage monitoring device of a body wash dispenser. The controller 382 may evaluate whether the child properly showered by comparing the amount of shampoo and/or body wash dispensed and the duration of the shower to predetermined minimum and maximum values, and store one or more records in the memory indicating the outcome of the evaluation. In one embodiment, the controller 382 may store a single record corresponding to the task of taking a shower. In this case, the record may include the date and time of the shower, an indicator that the task performed was showering, an indicator of the outcome of the task and, if unsuccessful, an indicator of the reason the task was not completed successfully, such as too much, too little or no shampoo and/or body wash was dispensed, the faucets were on for too long or too short a period of time, or a combination of reasons. Alternatively, the controller 382 may store a record for each step or product, package or facility involved in the task, such as one record for the usage of the shampoo dispenser 116, one record for the usage of the body wash dispenser, and one record for the usage of the bathtub/shower 126. As a further alternative, the controller 382 may be configured to store records for the overall task and for the usage of each component used during the task. This configuration may be desirable to evaluate the appropriateness of the usage of components of the system 100 such as the wipes tub 102 that may be used independently, or in conjunction with the toilet 122, hand soap dispenser 104, etc. as part of the task of going to the bathroom.

Once the information is stored in the memory 388, the records may be compiled, analyzed and output in any desired manner to evaluate the child's performance over a specified period of time. The controller 382 and other components of the base station 134 may be configured to implement one or more processes for analyzing the output data and outputting the results of the analysis to the child or the caregiver. In one embodiment, the input devices 390 may include a keyboard and/or mouse, the output devices 392 may include an LCD screen, and the controller 382 may be configured with software for a user interface allowing the child or caregiver to select particular records to be analyzed and displayed at the LCD screen. Depending on the configuration of the user interface, it may be possible to select the records based on the timeframe, the type of product or facility being used, the type of task being performed, the reason that an instance of usage or performance of a task was unsuccessful, and any other information stored with the records. Further, the results may be analyzed and displayed in any relevant manner for evaluating performance, and using any desired textual or graphical depiction of the results of the analysis. Still further, the output devices 392 may also include a printer, and the controller 382 may be configured to cause the results of the analysis to be printed in hard copy form in an appropriate textual or graphical presentation. In a particular embodiment, the controller 382 may be configured to retrieve all the records for a week's worth of activity in the system 100 and, using an appropriate grading algorithm, determine a letter grade for each of the tasks and type of product, package or facility usage monitored by the system 100, and generate and print a report card for the child that may be used by the child and the caregiver to evaluate the child's performance over the past week. Other configurations for retrieving, analyzing and displaying the historical information will be apparent to those skill in the art and are contemplated by the inventors as having use in interactive packaging systems in accordance with the invention.

As previously discussed, the interactive packaging system 100 may be implemented in an environment where there will be more than one child using the products, packages and facilities of the system 100 for personal hygiene training, and the children may be at different stages of development with different expectations for being able to perform person hygiene tasks. In such environments, the system 100 may be configured to distinguish between the users of the components of the system 100 and monitor their performance separately. In one embodiment, buttons 138 on the base station 134 illustrated in FIG. 1 may correspond to different children that may use the components of the system 100. In order to track a particular child's performance, the child or the caregiver may select the button 138 corresponding to the child, and the controller 382 may be configured to segregate the evaluation information and processing based on the button 138 selected at the time of the usage of the products, packages and facilities of the system 100.

In an alternative embodiment, the input devices 390 may include a voice recognition device, and the controller 382 may be configured to perform segregated processing based on the detected child's voice. As discussed above, in one embodiment, the base station 134 may be disposed in the restroom and include motion sensor 142 as one of the input devices 390 to detect when a person enters the restroom. Upon detecting motion in the restroom at the motion sensor 142, the controller 382 may cause may the speaker 148 to broadcast a prompt, such as "Who is there?" and await a response. The person in the restroom may then respond by stating their name, and the microphone 144 may detect the person's response and transmit the response to the controller 382. The controller 382 may be programmed with voice recognition software that may be configured to identify the person responding to the prompt based on the name stated by the respondent, or by the characteristics of the respondent's voice. If the controller 382 determines the respondent to be one of the children for which the system 100 is configured to monitor, the controller 382 may cause the speaker 148 to broadcast a greeting, and may begin monitoring the usage of the components of the system 100 by the responding child. If the controller 382 does not recognize the respondent, or recognizes the respondent to be a parent, an unmonitored sibling, a caregiver or other unmonitored user of the restroom, the base station 134 and other components of the system 100 may be configured to cease performing the monitoring and evaluation functions until a different person is detected in the restroom.

In a further alternative embodiment illustrated in FIG. 4, the system 100 may further include child identification devices 500 capable of communicating with the base station 134 and, if necessary, the usage monitoring devices 400, 420, 440, 460 and 480. The child identification device 500 may include radio frequency identification (RFID) tag 502 and a power supply 504, which may be incorporated into the RFID tag 502. The RFID tag 502 may be configured to transmit a message containing a unique identifier for the particular device 500, and the transceiver 394 of the base station 134 may be configured to detect the identification message from the RFID tag 502 when the device 500 is in relatively close proximity to the base station 134 during use of the components of the system 100. The child may carry the device 500 in his or her pocket so that it is with the child while using the components of the system 100. Alternatively, the device 500 may attached to an age-appropriate article of jewelry, such as the wristband or bracelet 144 or necklace 146 illustrated in FIG. 1, that may be attractive to child and, therefore, more likely to be worn continuously without distraction or the inconvenience of having to transfer the device 500 when the child changes clothes.

The controller 382 may be configured to perform separate processing of the activities of the child when the transceiver 394 detects the messages from the device 500. For example, the controller 382 may be configured to store historical information regarding each child's usage of the components of the system 100 in a manner allowing the information specific to a particular child to be retrieved and processed. In one implementation, the memory 388 may be divided into separate partitions or contain separate files for each child, with the controller 382 being configured to store the historical information for each child in the corresponding partition or file in memory 388. Alternatively, the records containing the historical information may include the unique identifier for the child to which the information in the record pertains such that records for the child may be retrieved based on the child's unique identifier.

In addition to segregating information based on the unique identifiers for the children, the controller 382 may be configured to use different criteria for evaluating the usage of the components of the system 100 and the performance of the person hygiene tasks by different children. For example, younger, smaller children may require less hand soap to wash their hands than older children, or a seven year old girl with long hair may require more shampoo than an eight year old boy with a crew cut. In these situations, the steps of performing tasks or the manner of usage of products, packages and facilities may be the same, but the parameters for evaluating success in performance or usage may vary based on the expectations for a particular child. To accommodate these varying expectations, the base station 134 may be configured to allow a caregiver to enter information at an input device 390 selecting or establishing parameters for each child that may be using the system 100, and associating the unique identifier for the child's device 500 with the selected or established parameters. The controller 382 may be configured to store the parameters for the child in an appropriate location in memory 388, and to retrieve and use the appropriate parameters in the evaluation routines for the child when the identification message from the child's device 500 is detected at the base station 134.

As previously discussed, some implementations of the system 100 may include any combination of components necessary to perform the necessary monitoring functions and, therefore, may include fewer than all of the components with which the base station 134 is configured to interact. The base station 134 may be configured to perform as much or as little of the available functionality as can be supported by the components of the system 100 once the base station 134 determines which products, packages and facilities are available. If all products, packages and facilities for which the base station 134 is configured to interact are available, the base station 134 may perform the full range of monitoring and evaluation functions. Where some of the components are not available, the base station 134 may be configured to compensate for the missing components. For example, where a wipes tub 102 is not present, the toilet training evaluation function of the base station 134 may use a default condition indicating that the child properly wiped in response to receiving a message from the device 460 indicating that a child sat on the seat of the toilet 122. As a further example, where a device 460 is not implemented with the toilet 122 and, correspondingly, the base station 134 will not receive toilet flushing messages, the base station 134 may use the receipt of a message of first use of the wipes tub 102 from the device 400 to evaluate the elapsed time between usage of the toilet 122 and the first usage of the hand soap dispenser 104. Those skilled in the art will understand that other default conditions, and alternative and compensatory processing may be implemented in the base station 134 and other components, and are contemplated by the inventors as being implemented in the system 100 in accordance with the disclosure.

Just as the base station 134 may be configured to compensate for varying combinations of components in the system 100, the usage monitoring devices themselves may have a modular configuration so that each device may perform individual product, package or facility usage monitoring as a stand-alone unit as discussed in relation to FIG. 2, may interactively communicate when other usage monitoring devices are implemented to monitor the usage of related products, packages and facilities as discussed in relation to FIG. 3, and may perform integrated usage monitoring and evaluation as integrated component of the system 100 as discussed in relation to FIGS. 1 and 4. In one embodiment, the usage monitoring devices may be configured in a similar manner as discussed for the base station 134 and may communicate with the other usage monitoring devices and base station 134 to determine which components of the system 100, if any, are present and monitoring the performance of personal hygiene tasks, and to perform as much or as little of their functionality as may be supported by the detected components, if any. In another embodiment, each device may include a mode switch operatively coupled to controller that may be manually set between stand-alone, interactive communication and full integration modes, with the controller being configured to perform certain functionality corresponding to each mode setting. Still further, each device may be configured to function in the same manner at all times such that the devices may transmit messages even when there are no other usage monitoring devices or a base station to receive the messages, and such that the failure to receive messages when no other devices are present will not result in determining that a child is improperly performing multi-component personal hygiene tasks.

In addition to communications between the components of the system 100, the base station 134 may be configured for communications with devices external to the system 100. For example, the base station 134 may be configured with a telephone line connection, USB port, network connection, such as a LAN or Internet connection, or other necessary hardware and software for connecting to external devices or networks. The external connection may be use to communicate with external sources to send and receive information related to the functionality of the system 100. The base station 134 may be configured to access external sources to download information to the base station 134. The downloaded information may include upgrades to the base station 134 and system 100 for changing and/or enhancing the functionality of the system 100. For example, information relating to additional products, packages and facilities that may be implemented in the system 100, or revisions to existing components of the system 100 may be downloaded. New software versions and upgrades for the base station 134 may also be downloaded and installed to implement desired enhancements for the system 100. Particular methods for downloading and installing software upgrades are known to those skilled in the art and are contemplated by the inventors as being implemented in the system 100 in accordance with the disclosure. Additionally, the base station 134 may use the connection to access a website via the Internet to view or download messages that may be unlocked and accessed once a specified set of tasks are completed properly by the child. Other implementations of communications between the components of the system 100 and external devices are contemplated by the inventors and may be implemented in the system 100 in accordance with the disclosure.

As indicated above, the processing distribution between the devices of the system 100 as illustrated and discussed in relation to FIG. 4 are exemplary, and other processing distributions are contemplated. In one embodiment, the devices 400, 420, 440, 460 and 480 may be configured to provide an output corresponding to the outcome of a usage evaluation performed by the controller 382 of the base station 134. The transmitters 410, 430, 450, 470 and 490 of the devices 400, 420, 440, 460 and 480, respectively, may be replaced by transceivers, and the devices 400, 420, 440, 460 and 480 may further include output devices for producing an output indicative of the outcome of the usage evaluation. The controller 382 of the base station 134 may be configured to format and transmit messages to the devices 400, 420, 440, 460 and 480 containing information regarding the outcome of the evaluations. The transceivers of the devices 400, 420, 440, 460 and 480 may be configured to detect the message from the controller 134 for the corresponding devices 400, 420, 440, 460 and 480, with the controllers 402, 422, 442, 462 and 482 causing the output devices to produce the appropriate output in response to receiving the messages.

In a further alternative embodiment, the devices 400, 420, 440, 460 and 480 may be configured to operate in the same manner as the devices 300, 320 and 340 discussed in the relation to FIGS. 2 and 3 and capable of performing all the usage evaluation processing and interactive communications, and further configured to transmit messages to the base station with information indicating the outcome of the usage and task evaluations. Correspondingly, the evaluation processing capabilities may not be implemented at the base station 134, and the controller 382 of the base station 134 may be configured to store and analyze the historical evaluation information received from the devices 400, 420, 440, 460 and 480. In a still further embodiment, the devices 400, 420, 440, 460 and 480 may be configured to perform the evaluation of the usage of the corresponding products, packages and facilities, and the base station may be configured to perform the evaluation of the tasks requiring the usage of multiple of the components of the system 100, such as the multi-component tasks described above in relation to FIG. 3 for example. In this embodiment, the base station 134 is configured to receive the interactive communications discussed above, and to perform the corresponding evaluations, such as the evaluating the time between the flushing of the toilet 102 and the initial usage of the wipes tub 102 or hand soap dispenser 104. To the extent necessary, the devices 400, 420, 440, 460 and 480 may be configured to transmit additional messages that may be necessary for the base station to evaluate the multi-component tasks, such as messages from the device 400 of the tub 102 indicating the opening of the lid of the tub 102 as detected by the sensor 406.

The interactive packaging system 100 as described in the various embodiments is designed to facilitate and enable the bathroom hygiene learning process for children by making the process fun, empowering and engaging. The system 100 not only engages children in the process, it enables the children to develop the necessary hygiene skills and independence by providing a suite of products, packages and facilities that can interact with the children, with each other and/or with the base station. The products, packages and facilities enable the child to develop health habits for life in the bathroom environment by offering feedback as to the appropriate and inappropriate usage of the products, packages and facilities, rather than simple engagement and/or providing product use instructions. There are many products currently available that engage the child with lights, sounds, timers, etc., or provide instructions for proper use. Contrastingly, the components of the system 100 go beyond engaging and instructing children by providing child-recognizable success feedback system that monitors how the products, packages and facilities have been used and issues response as to whether the components have been used properly or improperly. The feedback allows the children and the caregivers to know if the children have correctly used the components and whether the children have completely performed the required steps of the personal hygiene tasks, and ultimately to allow the children to demonstrate to their caregivers that they have performed the person hygiene tasks independently instead of requiring the caregivers to observe the performance of the children.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An interactive packaging system for monitoring usage of a plurality of personal hygiene products, personal hygiene product packages, and restroom facilities, the interactive packaging system comprising:
a plurality of usage monitoring devices each configured to detect physical stimulus associated with the usage of the product, package or facility with which the usage monitoring device is associate, and to transmit usage messages containing information relating to the detected physical stimulus; and
a base station configured to receive the usage messages transmitted by the plurality of usage monitoring devices and to generate sensory perceptible outputs corresponding to the information contained in the usage messages, wherein one of the usage monitoring devices and the base station is configured to determine whether the usage of the product, package or facility associated with a usage monitoring device is an appropriate usage based on the physical stimulus detected at the corresponding usage monitoring; and
wherein one of the usage monitoring devices is associated with a personal hygiene product package having a pump for dispensing a liquid personal hygiene product disposed therein and having a pump movement sensor operatively coupled to the base station, the pump movement sensor being configured to detect movement of the pump to dispense a portion of the liquid personal hygiene product disposed in the package, and to transmit a sensor output signal corresponding to the amount of pump movement detected by the sensor, and wherein the base station is programmed to receive the sensor output signals from the pump movement sensor, to calculate the amount of the liquid personal hygiene product dispensed from the package based on the sensor output signals received from the pump movement sensor.

2. The interactive packaging system in accordance with claim 1, wherein each usage monitoring device is configured to determine whether the usage of the associated product, package or facility is an appropriate usage based on the physical stimulus detected at the usage monitoring device, and wherein the usage messages transmitted by the usage monitoring devices contain information relating to the outcomes of the usage appropriateness determinations.

3. The interactive packaging system in accordance with claim 1, wherein the base station is configured to determine whether the usage of a product, package or facility associated with a received usage message is an appropriate usage based on the information contained in the received usage message.

4. The interactive packaging system in accordance with claim 3, wherein the base station is configured to transmit usage evaluation messages to the usage monitoring devices containing information relating to outcomes of the usage appropriateness determinations performed by the base station, and wherein each usage monitoring device is configured to receive the usage evaluation messages relating to the usage of the associated product, package or facility, and to output a sensory perceptible output corresponding to the outcome of the usage appropriateness determination.

5. The interactive packaging system in accordance with claim 1, wherein the interactive packaging system monitors the performance of personal hygiene tasks requiring the usage of a plurality of the products, packages and facilities of the interactive packaging system, and wherein the base station is configured to determine whether the personal hygiene task has been appropriately performed based on the information contained in the usage messages from the usage monitoring devices of the products, packages and facilities required to perform the personal hygiene task.

6. The interactive packaging system in accordance with claim 1, wherein the base station is configured to store information relating to outcomes of the usage appropriateness determinations for the products, packages and facilities of the interactive packaging system, to compile the information relating to the outcomes of the usage appropriateness determinations for a specified time period, and to output a summary of the outcomes of the usage appropriateness determinations for the products, packages and facilities of the interactive packaging system for the specified time period.

7. The interactive packaging system in accordance with claim 1, wherein the base station is configured to receive input regarding the identity of a user of the interactive packaging system, and to perform user-specific processing of the information contained in the usage messages based on the identity of the user received at the base station.

8. The interactive packaging system in accordance with claim 7, comprising a plurality of user identification devices each configured to transmit user identification messages containing the identity of a particular user associated with the user identification device, and wherein the base stations is configured to receive the user identification messages of a user identification device when the user identification device is disposed proximate the interactive packaging system, and to perform the user-specific processing of the information contained in the usage messages corresponding to the user identified in the user identification messages in response to receiving user identification messages.

9. A usage monitoring device for detecting usage of a personal hygiene product, a personal hygiene product package or a restroom facility, and for determining the appropriateness of the detected usage of the product, package or facility, the usage monitoring device comprising:
  at least one sensor configured to detect a physical stimulus associated with the usage of the product, package or facility with which the usage monitoring device is associated and to transmit a sensor output signal corresponding to the detected physical stimulus;
  an output device configured to generate a sensory perceptible output; and
  a controller operatively coupled to the at least one sensor and the output device,
    the controller being programmed to receive the sensor output signals from the at least one sensor,
    the controller being programmed to determine whether the usage of the associated product, package or facility is an appropriate usage of the associated product, package or facility based on the sensor output signals received from the at least one sensor, and
    the controller being programmed to cause the output device to generate a sensory perceptible output corresponding to an appropriate usage of the associated product, package or facility in response to determining that the usage of the associated product, package or facility was an appropriate usage; and
  wherein the usage monitoring device is associated with the personal hygiene product package having a means for dispensing a liquid personal hygiene product disposed therein, wherein the at least one sensor comprises a means for sensing movement operatively coupled to the controller, the means for sensing movement being configured to detect movement of the means for dispensing liquid personal hygiene product, and to transmit a sensor output signal corresponding to the amount of movement detected by the means for sensing movement, and wherein the controller is programmed to receive the sensor output signal from the means for sensing movement, to calculate the amount of the liquid personal hygiene product dispensed from the package based on the sensor output signals received, and to determine that a usage of the package is an appropriate usage based on the calculated amount of liquid personal hygiene product dispensed from the package.

10. The usage monitoring device in accordance with claim 9, wherein the controller is programmed to cause the output device to generate a sensory perceptible output corresponding to an inappropriate usage of the associated product, package or facility in response to determining that the usage of the associated product, package or facility was an inappropriate usage.

11. The usage monitoring device in accordance with claim 9, wherein the usage monitoring device is associated with a personal hygiene product package that is configured to be opened and closed during the dispensing of the personal hygiene product disposed therein, the at least one sensor comprising:
  a first sensor operatively coupled to the controller, the first sensor being configured to detect the opening and closing of the package, and to transmit sensor output signals corresponding to the opening and closing of the package; and
  a second sensor operatively coupled to the controller, the second sensor being configured to detect the dispensing of the personal hygiene product from the package, and to transmit sensor output signals corresponding to the dispensing of the product from the package,
  the controller being programmed to receive the sensor output signals from the first sensor and the second sensor,
  the controller being programmed to determine that a usage of the package is an appropriate usage in response to receiving a first sensor output signal from the first sensor, a sensor output signal from the second sensor, and a second sensor output signal from the first sensor.

12. The usage monitoring device in accordance with claim 11, wherein the controller is programmed to determine that a usage of the package is an appropriate usage in response to receiving a second sensor output signal from the first sensor within a predetermined period of time after receiving the first sensor output signal from the first sensor.

13. The usage monitoring device in accordance with claim 9, wherein the usage monitoring device is associated with a toilet, the at least one sensor comprising:
  a first sensor operatively coupled to the controller, the first sensor being configured to detect the proximity of a user to the toilet, and to transmit a sensor output signal indicating that a user is located proximate the toilet; and
  a second sensor operatively coupled to the controller, the second sensor being configured to detect the flushing of the toilet, and to transmit a sensor output signal corresponding to flushing of the toilet,
  the controller being programmed to receive the sensor output signals from the first sensor and the second sensor,
  the controller being programmed to determine that a usage of the toilet is an appropriate usage in response to receiving a sensor output signal from the second sensor within a predetermined period of time after receiving a sensor output signal from the first sensor.

14. The usage monitoring device in accordance with claim 9, wherein usage monitoring devices for related products, packages and facilities are configured to transmit usage messages to each other indicating usage of the corresponding products, packages and facilities, the usage monitoring device comprising a receiver operatively coupled to the controller, the receiver configured to receive a usage message from a usage monitoring device of a related product, package or facility, and to transmit the received usage message to the controller, the controller being programmed to receive the usage message from the controller, and to determine that a usage of the associated product, package or facility is an appropriate usage if a sensor output signal is received from the at least one sensor within a predetermined period of time after receiving the usage message.

15. The usage monitoring device in accordance with claim 9, wherein usage monitoring devices for related products, packages and facilities are configured to transmit usage messages to each other indicating usage of the corresponding products, packages and facilities, the usage monitoring device comprising a transmitter operatively coupled to the controller, the transmitter configured to transmit usage messages from the usage monitoring device, and the controller being programmed to cause the transmitter to transmit a usage message in response to receiving a sensor output signal from the at least one sensor.

16. The usage monitoring device in accordance with claim 9, wherein the usage monitoring devices are components of an interactive packaging system having a base station configured to receive usage monitoring messages from the usage monitoring devices of the interactive packaging system, the usage monitoring device comprising a transmitter operatively coupled to the controller, the transmitter configured to transmit usage monitoring messages from the usage monitoring device, and the controller being programmed to cause the transmitter to transmit a usage monitoring message to the base station in response to receiving sensor output signals from the at least one sensor.

* * * * *